US012601692B2

(12) United States Patent
Alonazi et al.

(10) Patent No.: US 12,601,692 B2
(45) Date of Patent: Apr. 14, 2026

(54) SYSTEMS AND METHODS FOR DETECTING FOREIGN OBJECT DEBRIS WITHIN A STRUCTURE

(71) Applicant: THE BOEING COMPANY, Arlington, VA (US)

(72) Inventors: Amani Alonazi, Jeddah (SA); Seema Chopra, Karnataka (IN); Martin Szarski, Brighton East (AU)

(73) Assignee: The Boeing Company, Arlington, VA (US)

( * ) Notice: Subject to any disclaimer, the term of this patent is extended or adjusted under 35 U.S.C. 154(b) by 122 days.

(21) Appl. No.: 18/543,003

(22) Filed: Dec. 18, 2023

(65) Prior Publication Data

US 2025/0198944 A1 Jun. 19, 2025

(51) Int. Cl.
*G01N 21/94* (2006.01)
*G01N 21/88* (2006.01)
*G01N 21/954* (2006.01)
*G06T 7/00* (2017.01)

(52) U.S. Cl.
CPC ........... *G01N 21/94* (2013.01); *G06T 7/0004* (2013.01); *G01N 2021/8887* (2013.01); *G01N 2021/9544* (2013.01); *G06T 2200/24* (2013.01); *G06T 2207/30164* (2013.01)

(58) Field of Classification Search
CPC ........... G01N 21/94; G01N 2021/8887; G01N 2021/9544; G06T 7/0004; G06T 2200/24; G06T 2207/30164
See application file for complete search history.

(56) References Cited

U.S. PATENT DOCUMENTS

2024/0290091 A1* 8/2024 Tissera ................... G06V 10/58

FOREIGN PATENT DOCUMENTS

| CN | 116973377 A | * | 10/2023 | ......... | G01N 21/9515 |
| JP | 2000329542 A | * | 11/2000 | ............. | G01B 15/04 |
| KR | 20210118063 A | * | 9/2021 | ......... | G01N 21/8851 |
| WO | WO-2023096908 A1 | * | 6/2023 | ........... | G06T 7/0002 |

OTHER PUBLICATIONS

Feng YZ, Sun DW. Application of hyperspectral imaging in food safety inspection and control: a review. Crit Rev Food Sci Nutr. 2012.

* cited by examiner

*Primary Examiner* — Jamil Ahmed
(74) *Attorney, Agent, or Firm* — Joseph M. Butscher; Carroll, Hoette & Butscher LLC

(57) ABSTRACT

A system and a method for detecting foreign object debris in relation to a structure include a probe configured to move in relation to the structure. The probe includes a hyperspectral imaging device configured to acquire hyperspectral image data of one or more portions of the structure. A control unit is in communication with the hyperspectral imaging device. The control unit is configured to receive the hyperspectral image data from the hyperspectral imaging device, and analyze the hyperspectral image data to detect a presence of the foreign object debris.

20 Claims, 3 Drawing Sheets

SYSTEMS AND METHODS FOR DETECTING FOREIGN OBJECT DEBRIS WITHIN A STRUCTURE

FIELD OF THE DISCLOSURE

Examples of the present disclosure generally relate to systems and methods for detecting foreign object debris within a structure, such as one or more portions of an aircraft during a manufacturing process.

BACKGROUND OF THE DISCLOSURE

During a manufacturing process, various components are operated on by tools. For example, drills are operated on panels, stringers, skins, and the like of a wing of an aircraft during a manufacturing process. As tools operate on components, foreign object debris can be generated. In particular, as a drill bit passes through a panel, small pieces of the panel can be generated. Drilling and cutting through components typically generates foreign object debris.

A known method for detecting the presence of foreign object debris includes radiographic inspection. However, such method can take a relatively long time (such as two or more days) to scan an aircraft, and often requires individuals to evacuate an area within the vicinity of the aircraft due to the presence of a significant amount of radiation.

Optionally, detection of foreign object debris can occur via visual inspection. However, manual inspection of complex structures is time and labor intensive, and can be prone to human error.

SUMMARY OF THE DISCLOSURE

A need exists for an improved system and method for detecting foreign object debris within a structure, such as one or more portions of an aircraft. With that need in mind, certain examples of the present disclosure provide a system for detecting foreign object debris in relation to a structure. The system includes a probe configured to move in relation to the structure. The probe includes a hyperspectral imaging device configured to acquire hyperspectral image data of one or more portions of the structure. A control unit is in communication with the hyperspectral imaging device. The control unit is configured to receive the hyperspectral image data from the hyperspectral imaging device, and analyze the hyperspectral image data to detect a presence of the foreign object debris.

In at least one example, the system also includes a robot. For example, the robot includes the probe. The robot is configured to move the probe in relation to the structure. In at least one further example, the control unit can be further configured to control operation of one or both of the probe or the robot.

The probe can also include a lighting device configured to illuminate the one or more portions of the structure.

The probe can also include a debris collector configured to remove the foreign object debris from the structure. As an example, the debris collector includes a vacuum generator.

The system can also include a user interface including a display. The control unit can be further configured to show one or more images of the foreign object debris on the display.

In at least one example, the control unit is an artificial intelligence system or a machine learning system.

In at least one example, the control unit is configured to analyze the hyperspectral image data by removing data that is not associated with the foreign object debris.

Certain examples of the present disclosure provide a method for detecting foreign object debris in relation to a structure. The method includes moving a probe in relation to the structure, wherein the probe comprises a hyperspectral imaging device; acquiring, by the hyperspectral imaging device, hyperspectral image data of one or more portions of the structure; receiving, by a control unit in communication with the hyperspectral imaging device, the hyperspectral image data from the hyperspectral imaging device; and analyzing, by the control unit, the hyperspectral image data to detect a presence of the foreign object debris.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Figure 1:
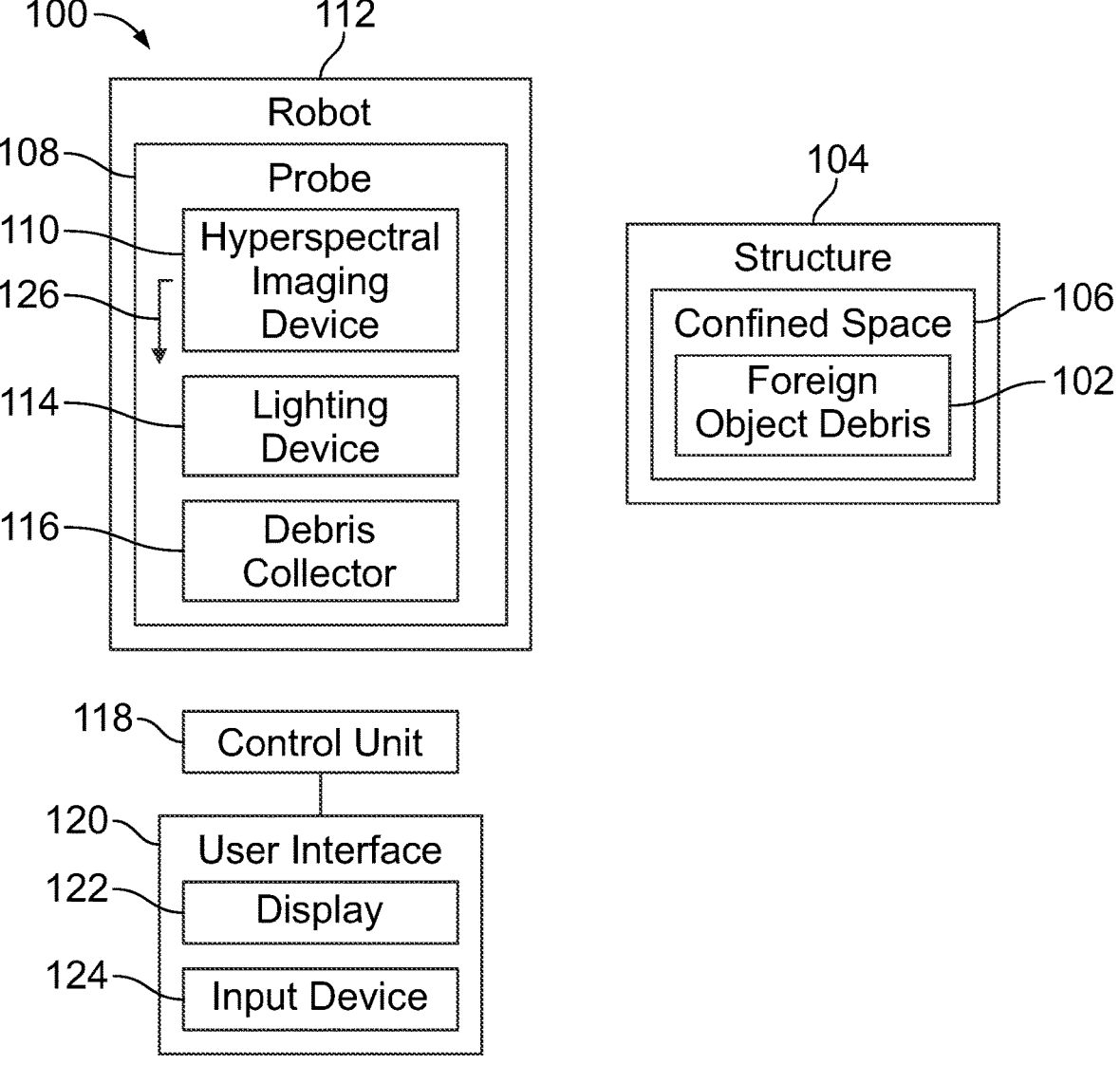
FIG. 1 illustrates a block diagram of a system for detecting foreign object debris within a structure, according to an example of the present disclosure.

FIG. 1 illustrates a block diagram of a system 100 for detecting foreign object debris 102 within a structure 104, according to an example of the present disclosure. The structure 104 can be a portion of an assembly being manufactured. As another example, the structure 104 can be an existing structure, and the system 100 can be used for in-service detection of foreign object debris 104, such as during a maintenance process. In at least one example, the structure 104 can be a portion of a vehicle. As a further example, the structure 104 is a portion of an aircraft being manufactured, such as a fuel tank, a portion of a wing, a portion of a fuselage, and/or the like. The structure 104 can include a confined space 106, which includes the foreign object debris 102. As an example, the structure 104 can be a fuel tank having a confined internal chamber that may not be accessible by an individual. The foreign object debris 102 within the confined space 106 can be metal shavings generated by one or more manufacturing processes, such as cutting, drilling, sawing, and/or the like. The foreign object debris 102 can be on and/or in any area, location in which foreign object debris may be reasonably expected to be present.

In order to detect the foreign object debris 102 within the structure 104, the system 100 includes a probe 108 having a hyperspectral imaging device 110, such as a hyperspectral camera. The hyperspectral imaging device 110 is configured to acquire hyperspectral image data 126 of the structure 104, including the foreign object debris 102. The hyperspectral image data 126 includes numerous hyperspectral images within different bands or wavelengths.

The hyperspectral imaging device 110 is mounted on the probe 108. In at least one example, a robot 112 incudes the probe 108. That is, the probe 108 can be a moveable portion of the robot 112. For example, the probe 108 can be an end effector, one or more articulated arms, a flexible endoscopic-type probe, and/or the like. The robot 112 can include one or more of automated wheels, legs, and/or the like that are configured to allow the robot 112 to move into the confined space 106. As another example, the robot 112 can include a fixed base, and the probe 108 is configured to move into the confined space 106. In at least other example, the probe 108 may not be part of a robot 112. For example, the system 100 may not include the robot 112. Instead, the probe 108 can be a handheld device that can be maneuvered onto and/or into the structure 104.

In at least one example, the probe 108 also includes a lighting device 114 configured to illuminate the structure 104, such as within the confined space 106. As an example, the lighting device 114 is or otherwise includes a halogen lamp mounted on the probe 108. As another example, the lighting device 114 includes one or more light emitting diodes (LEDs) mounted on the probe 108. The lighting device 114 is configured to generate light to illuminate one or more portions of the structure 104 to allow the hyperspectral imaging device 110 to readily acquire hyperspectral image data of the structure 104. Optionally, the probe 108 may not include the lighting device 114.

In at least one example, the probe 108 also includes a debris collector 116 configured to collect one or more portions of the foreign object debris 102. The debris collector 116 is mounted on the probe 108. As an example, the debris collector 116 can be a vacuum generator configured to remove the foreign object debris 102 through vacuum and/or suction force. As another example, the debris collector 116 includes a grappling or clasp assembly configured to grasp the foreign object debris 102. Optionally, the probe 108 may not include the debris collector 116.

The system 100 also includes a control unit 118 in communication with the hyperspectral imaging device 110 through one or more wired or wireless connections. In at least one example, the control unit 118 can also be in communication with the robot 112, such as through one or more wired or wireless connections, and configured to control operation of the robot 112, the probe, the hyperspectral imaging device 110, the lighting device 114, and/or the debris collector 116. Optionally, the control unit 118 may not be configured to control operation of the robot 112, the probe 108, the hyperspectral imaging device 110, and/or the debris collector 116.

As shown, the control unit 118 can be remotely located from the probe 108. As another example, the probe 108 or the robot 112 can include the control unit 118.

The control unit 118 can also be in communication with a user interface 120, such as through one or more wired or wireless connections. In at least one example, the control unit 118 and the user interface 120 can be located at a central monitoring location. The user interface 120 includes a display 122, such as an electronic monitor, screen, an electronic heads-up display, augmented or virtual reality glasses, or smart glasses, and/or the like. The display 122 can be in communication with an input device 124, such as a keyboard, a mouse, a stylus, a joystick, and/or the like. In at least one example, the display 122 and input device 124 are integrated as a touchscreen interface. The user interface 120 may be part of a computer workstation. As another example, the user interface 120 can be part of a handheld smart device. In at least one example, after analyzing the hyperspectral image data 126 to determine the presence of the foreign object debris 102, the control unit 118 can show one or more images of the foreign object debris 102 on the display 122. Optionally, the system 100 may not include the user interface 120.

In operation, the probe 108 is maneuvered onto and/or into the confined space of the structure 104, and the hyperspectral imaging device 110 acquires hyperspectral image data 126 of the structure 104, which can include the foreign object debris 102 within the confined space 106. The control unit 118 receives the hyperspectral image data 126 from the hyperspectral imaging device 110. Within the hyperspectral image data 126, the control unit 118 analyzes a wide spectrum of light instead of only primary colors. Light striking each pixel is broken down into numerous spectral bands.

Because the hyperspectral imaging device 110 can be mounted on the probe 108 of the robot 112, the hyperspectral imaging device 110 can have freedom of movement in all directions, and be maneuvered into various areas of the confined space 106 to acquire the hyperspectral imaging data 126, which is then analyzed by the control unit 118 to detect locations of the foreign object debris 102. In response to receiving the hyperspectral imaging data 126 from the hyperspectral imaging device 110, the control unit 118 analyzes the hyperspectral imaging data 126, such as via self-supervised machine learning, to subtract or otherwise remove background images, and apply clustering to predict whether or not the foreign object debris 102 is present, thereby enabling real-time, precise, and reliable detection of the foreign object debris 102. The control unit 118 analyzes the hyperspectral imaging data 126 to automatically detect, localize, and identify the foreign object debris 102 within the hyperspectral imaging data 126 based on differentiating wavelengths or bands, in which every pixel can reveal spectral properties of the material. In this manner, the control unit 118 effectively differentiates the foreign object debris 102 (such as metal shavings, tape, sealant, caps, washers, dirt, dust, and/or the like) from background images (such as known features of the structure 104). After the control unit 118 identifies the foreign object debris 102 within the hyperspectral image data 126, the debris collector 116 can then be used to remove the foreign object debris 102 from the structure 104.

As described herein, the system 100 is configured to detect foreign object debris 102 in relation to the structure 104. The system 100 includes the probe 108 configured to move in relation to (such as above one or more outer surfaces, within, and/or the like) the structure 104. The probe 108 includes the hyperspectral imaging device 110 configured to acquire hyperspectral image data 126 of one or more portions of the structure 104. The control unit 118 is in communication with the hyperspectral imaging device 110. The control unit 118 is configured to receive the hyperspectral imaging data 126 from the hyperspectral imaging device, 110, and analyze the hyperspectral imaging data 126 to detect a presence of the foreign object debris 102.

In at least one example, the system 100 also includes the robot 112. For example, the robot 112 includes the probe 108. The robot 112 is configured to move the probe 108 in relation to the structure 104. Optionally, the system 100 may not include the robot 112, and the probe 108 can be a handheld device that is configured to be manually operated.

The probe 108 can also include the lighting device 114 configured to illuminate the one or more portions of the structure 104. The probe 108 can also include the debris collector 116 configured to remove the foreign object debris 102 from the structure 104. For example, the debris collector 116 can include a vacuum generator.

As used herein, the term "control unit," "central processing unit," "unit," "CPU," "computer," or the like can include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 118 can be or include one or more processors that are configured to control operation thereof, as described herein.

The control unit 118 is configured to execute a set of instructions that are stored in one or more data storage units or elements (such as one or more memories), in order to process data. For example, the control unit 118 can include or be coupled to one or more memories. The data storage units can also store data or other information as desired or needed. The data storage units can be in the form of an information source or a physical memory element within a processing machine. The one or more data storage units or elements can comprise volatile memory or nonvolatile memory, or can include both volatile and nonvolatile memory. As an example, the nonvolatile memory can comprise read only memory (ROM), programmable ROM (PROM), electrically programmable ROM (EPROM), electrically erasable PROM (EEPROM), and/or flash memory and volatile memory can include random access memory (RAM), which can act as external cache memory. The data stores of the disclosed systems and methods is intended to comprise, without being limited to, these and any other suitable types of memory.

The set of instructions can include various commands that instruct the control unit 118 as a processing machine to perform specific operations such as the methods and processes of the various embodiments of the subject matter described herein. The set of instructions can be in the form of a software program. The software can be in various forms such as system software or application software. Further, the software can be in the form of a collection of separate programs, a program subset within a larger program or a portion of a program. The software can also include modular programming in the form of object-oriented programming. The processing of input data by the processing machine can be in response to user commands, or in response to results of previous processing, or in response to a request made by another processing machine.

The diagrams of embodiments herein illustrate one or more control or processing units, such as the control unit 118. It is to be understood that the processing or control units can represent circuits, circuitry, or portions thereof that can be implemented as hardware with associated instructions (e.g., software stored on a tangible and non-transitory computer readable storage medium, such as a computer hard drive, ROM, RAM, or the like) that perform the operations described herein. The hardware can include state machine circuitry hardwired to perform the functions described herein. Optionally, the hardware can include electronic circuits that include and/or are connected to one or more logic-based devices, such as microprocessors, processors, controllers, or the like. Optionally, the control unit 118 can represent processing circuitry such as one or more of a field programmable gate array (FPGA), application specific integrated circuit (ASIC), microprocessor(s), and/or the like. The circuits in various embodiments can be configured to execute one or more algorithms to perform functions described herein. The one or more algorithms can include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

In at least one example, all or part of the systems and methods described herein may be or otherwise include an artificial intelligence (AI) or machine-learning system that can automatically perform operations of the methods described herein. For example, the control unit 118 can be an artificial intelligence system or a machine learning system. These types of systems may be trained from outside information and/or self-trained to repeatedly improve the accuracy with how data is analyzed to automatically detect the foreign object debris 102 within the hyperspectral image data 126. Over time, these systems can improve by determining such information with increasing accuracy and speed, thereby significantly reducing the likelihood of any potential errors. For example, the AI or machine-learning systems can learn and determine sizes, bands, wavelengths, and/or the like of materials that are likely foreign object debris 102 to automatically detect spectral fingerprints of such materials within the hyperspectral image data 126. The AI or machine-learning systems described herein may include technologies enabled by adaptive predictive power and that exhibit at least some degree of autonomous learning to automate and/or enhance pattern detection (for example, recognizing irregularities or regularities in data), customization (for example, generating or modifying rules to optimize record matching), and/or the like. The systems may be trained and re-trained using feedback from one or more prior analyses of the data, ensemble data, and/or other such data. Based on this feedback, the systems may be trained by adjusting one or more parameters, weights, rules, criteria, or the like, used in the analysis of the same. This process can be performed using the data and ensemble data instead of training data, and may be repeated many times to repeatedly improve the determination and location of various materials within the hyperspectral image data 126. The training minimizes conflicts and interference by performing an iterative training algorithm, in which the systems are retrained with an updated set of data, and based on the feedback examined prior to the most recent training of the systems. This provides a robust analysis model that can better determine locations, features, structures, and/or the like in a cost effective and efficient manner.

Figure 2:
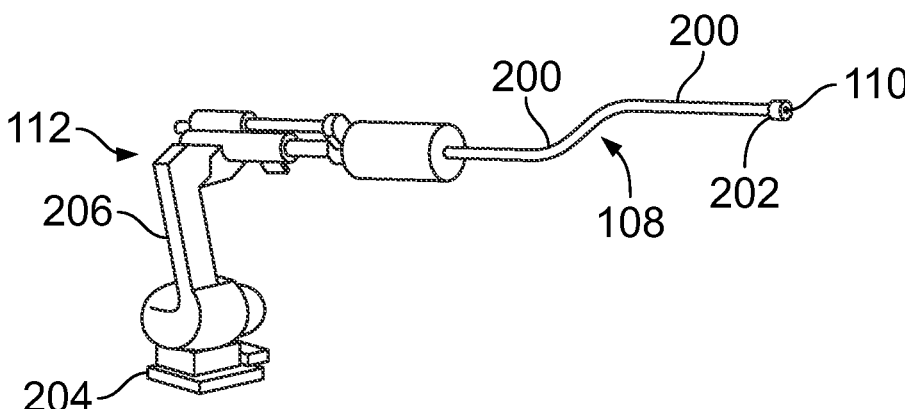
FIG. 2 illustrates a perspective view of a robot, according to an example of the present disclosure.

FIG. 2 illustrates a perspective view of a robot 112, according to an example of the present disclosure. The robot 112 includes the probe 108, which can include one or more articulating arms 200. The hyperspectral imaging device 110 can be mounted on a distal end 202 of the probe 108. The robot 112 can further include a base 204, which can further include one or more conveyance devices, such as wheels, moveable tracks, legs, and/or the like. Optionally, the base 204 can be fixed in place. The base 204 supports one or more moveable arms 206 coupled to the probe 108. The robot 112 shown in FIG. 2 is merely an example, and is non-limiting. The robot 112 can include more, fewer, and/or different components than shown.

Figure 3:
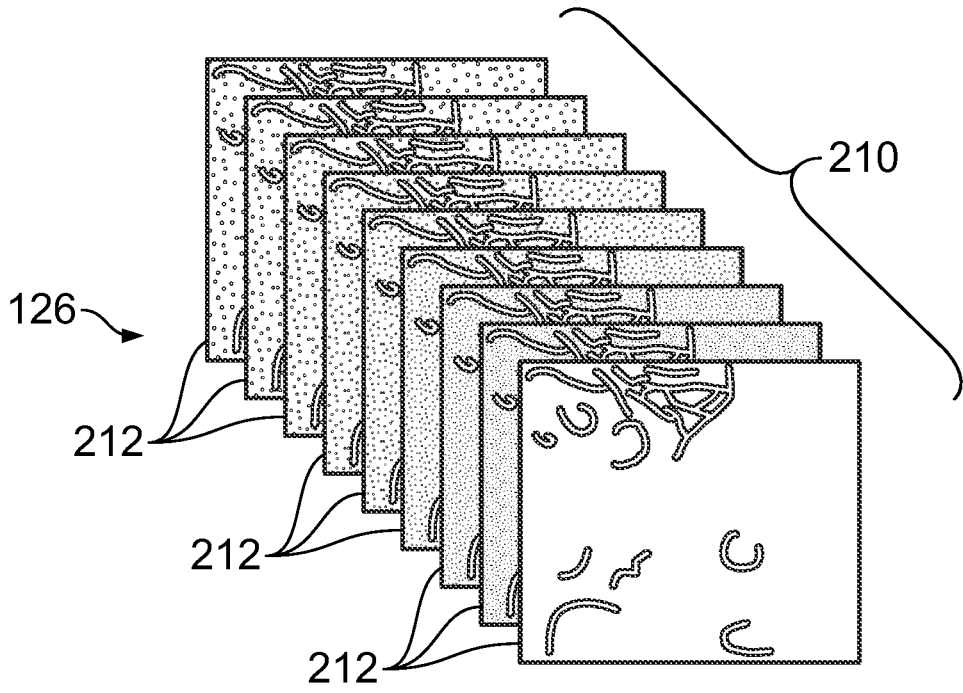
FIG. 3 illustrates hyperspectral image data, according to an example of the present disclosure.

FIG. 3 illustrates hyperspectral image data 126, according to an example of the present disclosure. The hyperspectral image data 126 can be or otherwise include a hyperspectral cube 210 including aspects 212, such as wavelengths or bands, which can be acquired at different channels. Each aspect 212, such as a specific wavelength or band, corresponds to a different material. The hyperspectral image data 126 includes red, green, and blue wavelengths, infrared wavelengths, and near infrared wavelengths.

Referring to FIGS. 1-3, the control unit 118 associates one or more of the aspects 212 with one or more particular materials determined (such as pre-determined and/or learned through artificial intelligence or machine learning) to be foreign object debris 102. In at least one example, the control unit 118 segments the hyperspectral image data 126 to remove background images. For example, the control unit 118 subtracts or otherwise removes image data that is not associated with sizes, shapes, and spectral fingerprints of the foreign object debris 102 (such as Aluminum shavings). As such, the control unit 118 is able to automatically detect the presence of the foreign object debris 102 within the hyperspectral image data 126.

In at least one example, the control unit 118 detects one or more anomalies within the hyperspectral image data 126. The anomalies are determined to be the foreign object debris 102. For example, the control unit 118 can operate as a self-supervised vision transformer to determine features within the hyperspectral image data 126. The control unit 118 can then localize objects within the hyperspectral image data 126, and divide portions of the hyperspectral image data 126 (such as images at different bands or wavelengths) into patches. As a further example, the control unit 118 can determine that patches within the object correlate more with each other than with background patches. Further, a patch with little correlation in an image has a higher chance of belonging to an object, which can be determined to be the foreign object debris 102. In at least one example, the control unit 118 is configured to learn visual features within the hyperspectral image data without supervision through one or more algorithms, such as DINO.

The hyperspectral image data 126 includes spectral responses of different materials, such as different metals. The control unit 118 analyzes the hyperspectral image data 126 to remove spectral responses of materials that are not determined to be foreign object debris 102, leaving the spectral responses of materials that are determined to be foreign object debris 102. Such determined materials can be predetermined and preprogrammed into memory. In at least one other example, the control unit 118 can automatically learn and determine such materials.

In at least one example, the hyperspectral imaging device 110 is moved, such as linearly, in relation to the structure 104. For example, the probe 108 can be moved by the robot 112. Optionally, the probe 108 can be moved by hand. During such movement, the hyperspectral imaging device 110 acquires the hyperspectral image data 126 of the structure 104. The hyperspectral image data 126 can include numerous images in different bands. For example, the hyperspectral image data 126 can include eight different images in eight bands, although the number of images can be greater or less than eight. The control unit 118 analyzes each of the different images, and detects the foreign object debris 102 within one or more of the images by detecting an anomaly in a band associated with the foreign object debris 102, such as a band between 825-850 nanometers (although such band is merely an example, and other bands can be used). Such band can be associated with Aluminum shavings, for example.

The control unit 118 is programmed to determine that an individual object has a unique spectral signature within the hyperspectral image data 126. The control unit 118 can further determine that a predetermined type of foreign object debris 102, such as Aluminum shavings, has a spectral fingerprint within a predetermined band, such as within a range of 800-1500 nanometers. Upon detecting a wavelength within such band, the control unit 118 removes other image data, leaving only the image data within the predetermined band of interest.

Figure 4:
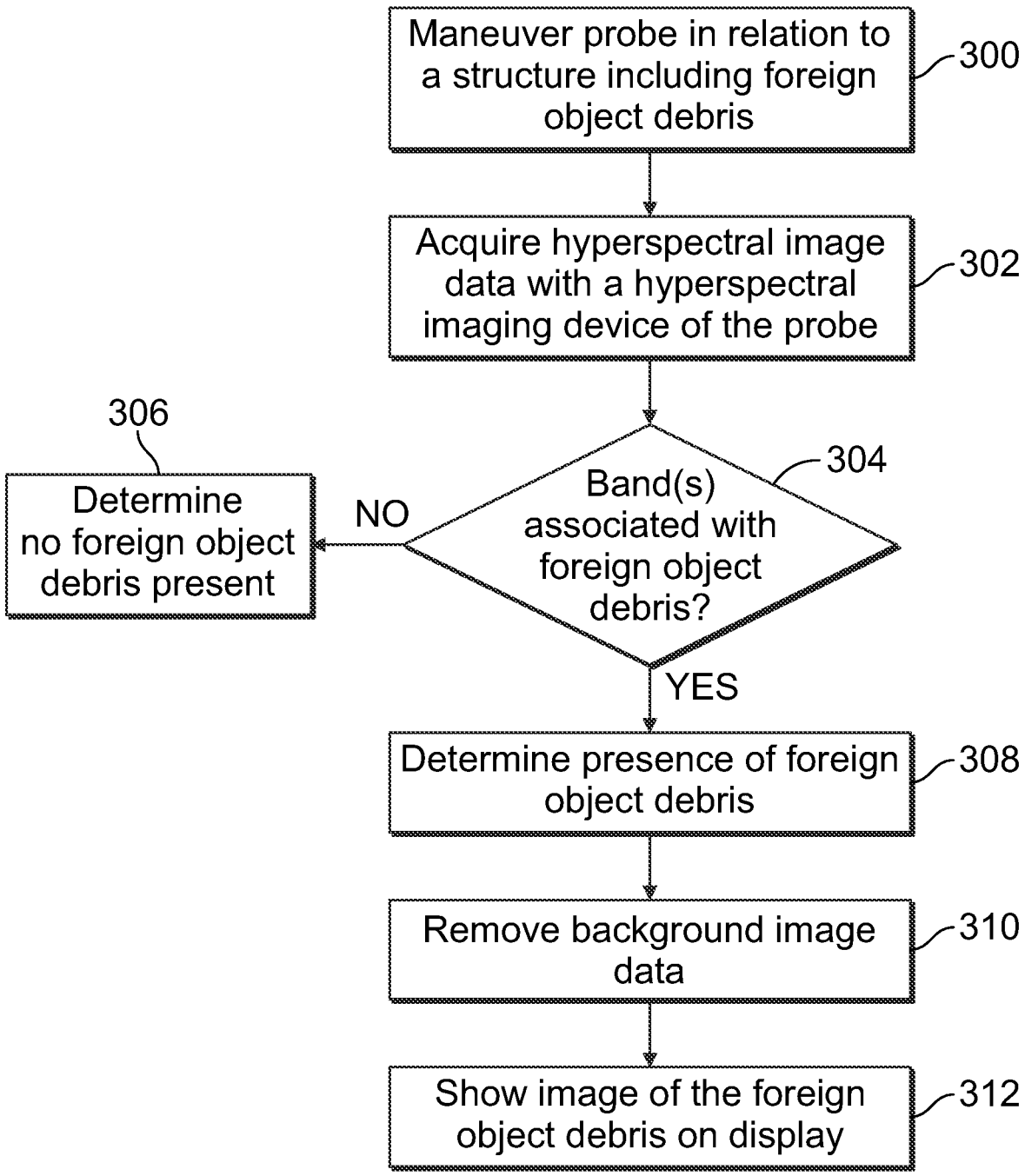
FIG. 4 illustrates a flow chart of a method, according to an example of the present disclosure.

FIG. 4 illustrates a flow chart of a method, according to an example of the present disclosure. Referring to FIGS. 1-4, at 300, the probe 108 is maneuvered in relation to a structure 104 including the foreign object debris 102. For example, the robot 112 operates to move the probe 108 on and/or into the confined space 106 of the structure 104.

At 302, the hyperspectral imaging device 110 acquires the hyperspectral image data 126. As an example, as the probe 108 is moved in relation to the structure, the hyperspectral imaging device 110 acquires the hyperspectral image data 126.

At 304, the control unit 118 determines if the hyperspectral image data 126 includes one or more bands (for example, ranges of wavelengths) associated with the foreign object debris 102. If not, the method proceeds to 306, at which the control unit 118 determines that there is no foreign object debris present.

If, however, the control unit 118 determines that the hyperspectral image data 126 include one or more bands associated with the foreign object debris 102, at 308, the control unit 118 determines that the foreign object debris 102 is present in relation to the structure 104. At 310, the control unit 118 then removes background image data (that is, data not associated with the foreign object debris 102) from the hyperspectral image data 126. At 312, the control unit 118 can then show an image of the foreign object debris 102 on the display 122 of the user interface 120.

Further, the disclosure comprises examples according to the following clauses:

Clause 1. A system for detecting foreign object debris in relation to a structure, the system comprising:

a probe configured to move in relation to the structure, wherein the probe comprises a hyperspectral imaging device configured to acquire hyperspectral image data of one or more portions of the structure; and a control unit in communication with the hyperspectral imaging device, wherein the control unit is configured to:

receive the hyperspectral image data from the hyperspectral imaging device, and analyze the hyperspectral image data to detect a presence of the foreign object debris.

Clause 2. The system of Clause 1, further comprising a robot, wherein the robot comprises the probe, and wherein the robot is configured to move the probe in relation to the structure.

Clause 3. The system of Clause 2, wherein the control unit is further configured to control operation of one or both of the probe or the robot.

Clause 4. The system of any of Clauses 1-3, wherein the probe further comprises a lighting device configured to illuminate the one or more portions of the structure.

Clause 5. The system of any of Clauses 1-4, wherein the probe further comprises a debris collector configured to remove the foreign object debris from the structure.

Clause 6. The system of Clause 5, wherein the debris collector comprises a vacuum generator.

Clause 7. The system of any of Clauses 1-6, further comprising a user interface including a display, wherein the control unit is further configured to show one or more images of the foreign object debris on the display.

Clause 8. The system of any of Clauses 1-7, wherein the control unit is an artificial intelligence system or a machine learning system.

Clause 9. The system of any of Clauses 1-8, wherein the control unit is configured to analyze the hyperspectral image data by removing data that is not associated with the foreign object debris.

Clause 10. A method for detecting foreign object debris in relation to a structure, the method comprising:

moving a probe in relation to the structure, wherein the probe comprises a hyperspectral imaging device;

acquiring, by the hyperspectral imaging device, hyperspectral image data of one or more portions of the structure;

receiving, by a control unit in communication with the hyperspectral imaging device, the hyperspectral image data from the hyperspectral imaging device; and analyzing, by the control unit, the hyperspectral image data to detect a presence of the foreign object debris.

Clause 11. The method of Clause 10, wherein said moving comprises moving, by a robot, the probe.

Clause 12. The method of Clause 11, further comprising controlling, by the control unit, operation of one or both of the probe or the robot.

Clause 13. The method of any of Clauses 10-12, further comprising illuminating, by a lighting device of the probe, the one or more portions of the structure.

Clause 14. The method of any of Clauses 10-13, further comprising removing, by a debris collector of the probe, the foreign object debris from the structure.

Clause 15. The method of any of Clauses 10-14, further comprising showing, by the control unit, one or more images of the foreign object debris on a display of a user interface.

Clause 16. The method of any of Clauses 10-15, wherein the control unit is an artificial intelligence system or a machine learning system.

Clause 17. The method of any of Clauses 10-16, wherein said analyzing comprises removing data that is not associated with the foreign object debris.

Clause 18. A system for detecting foreign object debris in relation to a structure, the system comprising:

a robot including a probe, wherein the robot is configured to move the probe in relation to the structure, wherein the probe comprises a hyperspectral imaging device configured to acquire hyperspectral image data of one or more portions of the structure;

a control unit in communication with the hyperspectral imaging device, wherein the control unit is an artificial intelligence system or a machine learning system; and a user interface including a display, wherein the control unit is configured to:

receive the hyperspectral image data from the hyperspectral imaging device, analyze the hyperspectral image data to detect a presence of the foreign object debris, and show one or more images of the foreign object debris on the display.

Clause 19. The system of Clause 18, wherein the probe further comprises:

a lighting device configured to illuminate the one or more portions of the structure; and a debris collector configured to remove the foreign object debris from the structure.

Clause 20. The system of Clauses 18 or 19, wherein the control unit is configured to analyze the hyperspectral image data by removing data that is not associated with the foreign object debris.

As described herein, examples of the present disclosure provide improved systems and methods for detecting foreign object debris within a structure, such as one or more portions of an aircraft.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112 (f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system for detecting foreign object debris in relation to a structure, the system comprising:
a probe configured to move in relation to the structure, wherein the probe comprises:
a hyperspectral imaging device configured to acquire hyperspectral image data of one or more portions of the structure; and
a debris collector configured to remove the foreign object debris from the structure; and
a control unit in communication with the hyperspectral imaging device, wherein the control unit is configured to:
receive the hyperspectral image data from the hyperspectral imaging device, and
analyze the hyperspectral image data to detect a presence of the foreign object debris.

2. The system of claim 1, further comprising a robot, wherein the robot comprises the probe, and wherein the robot is configured to move the probe in relation to the structure.

3. The system of claim 2, wherein the control unit is further configured to control operation of one or both of the probe or the robot.

4. The system of claim 1, wherein the probe further comprises a lighting device configured to illuminate the one or more portions of the structure.

5. The system of claim 1, wherein the debris collector comprises a vacuum generator.

6. The system of claim 1, further comprising a user interface including a display, wherein the control unit is further configured to show one or more images of the foreign object debris on the display.

7. The system of claim 1, wherein the control unit is an artificial intelligence system or a machine learning system.

8. The system of claim 1, wherein the control unit is configured to analyze the hyperspectral image data by removing data that is not associated with the foreign object debris.

9. A method for detecting foreign object debris in relation to a structure, the method comprising:
moving a probe in relation to the structure, wherein the probe comprises a hyperspectral imaging device and a debris collector configured to remove the foreign object debris from the structure;
acquiring, by the hyperspectral imaging device, hyperspectral image data of one or more portions of the structure;
receiving, by a control unit in communication with the hyperspectral imaging device, the hyperspectral image data from the hyperspectral imaging device; and analyzing, by the control unit, the hyperspectral image data to detect a presence of the foreign object debris.

10. The method of claim 9, wherein said moving comprises moving, by a robot, the probe.

11. The method of claim 10, further comprising controlling, by the control unit, operation of one or both of the probe or the robot.

12. The method of claim 9, further comprising illuminating, by a lighting device of the probe, the one or more portions of the structure.

13. The method of claim 9, further comprising removing, by the debris collector of the probe, the foreign object debris from the structure.

14. The method of claim 9, further comprising showing, by the control unit, one or more images of the foreign object debris on a display of a user interface.

15. The method of claim 9, wherein the control unit is an artificial intelligence system or a machine learning system.

16. The method of claim 9, wherein said analyzing comprises removing data that is not associated with the foreign object debris.

17. A system for detecting foreign object debris in relation to a structure, the system comprising:
a robot including a probe, wherein the robot is configured to move the probe in relation to the structure, wherein the probe comprises a hyperspectral imaging device configured to acquire hyperspectral image data of one or more portions of the structure and a debris collector configured to remove the foreign object debris from the structure;
a control unit in communication with the hyperspectral imaging device, wherein the control unit is an artificial intelligence system or a machine learning system; and
a user interface including a display, wherein the control unit is configured to:
receive the hyperspectral image data from the hyperspectral imaging device,
analyze the hyperspectral image data to detect a presence of the foreign object debris, and
show one or more images of the foreign object debris on the display.

18. The system of claim 17, wherein the probe further comprises a lighting device configured to illuminate the one or more portions of the structure.

19. The system of claim 17, wherein the control unit is configured to analyze the hyperspectral image data by removing data that is not associated with the foreign object debris.

20. The system of claim 1, wherein the probe comprises one or more articulating arms, and wherein the hyperspectral imaging device is mounted on a distal end of the one or more articulating arms.

* * * * *